ns Patent

Casey et al.

[15] 3,687,318
[45] Aug. 29, 1972

[54] MOTORCYCLE MOUNT FOR AUTOMOBILE BODIES

[72] Inventors: Norris A. Casey, 4658 Greenbush Dr., Concord, Calif. 94521; James R. Ivy, 2 Bristol Court, Pleasant Hill, Calif. 94523

[22] Filed: Aug. 24, 1970

[21] Appl. No.: 66,453

[52] U.S. Cl. ................................................214/450
[51] Int. Cl. ................................................B60r 9/00
[58] Field of Search.........214/450; 224/29, 42.03 B, 224/42.1 LM; 296/1 A

[56] References Cited

UNITED STATES PATENTS 3,527,371  9/1970  Townsend, Jr. ............214/450
3,528,578  9/1970  Schoenberger............214/450
2,684,264  7/1954  Demos.......................296/1 A
3,498,480  3/1970  Gutridge..................214/38 D Primary Examiner—Robert G. Sheridan
Assistant Examiner—John Mannix
Attorney—Warren, Rubin, Brucker & Chickering

[57] ABSTRACT

A motorcycle mount for conventional automobile bodies and including an elongated trough-shaped section for receiving and anchoring therein at least the rear wheel of the motorcycle and front and rear mounting means for the section which is dimensioned and constructed for resting upon strong point areas of the conventional automobile body, namely the top corner portion at the rear window area and the side corner portions surmounting the rear fenders of the body.

6 Claims, 11 Drawing Figures

INVENTORS
Norris A. Casey
James R. Ivy
BY
Warren Rubin
Brucker & Chickering
Attorneys

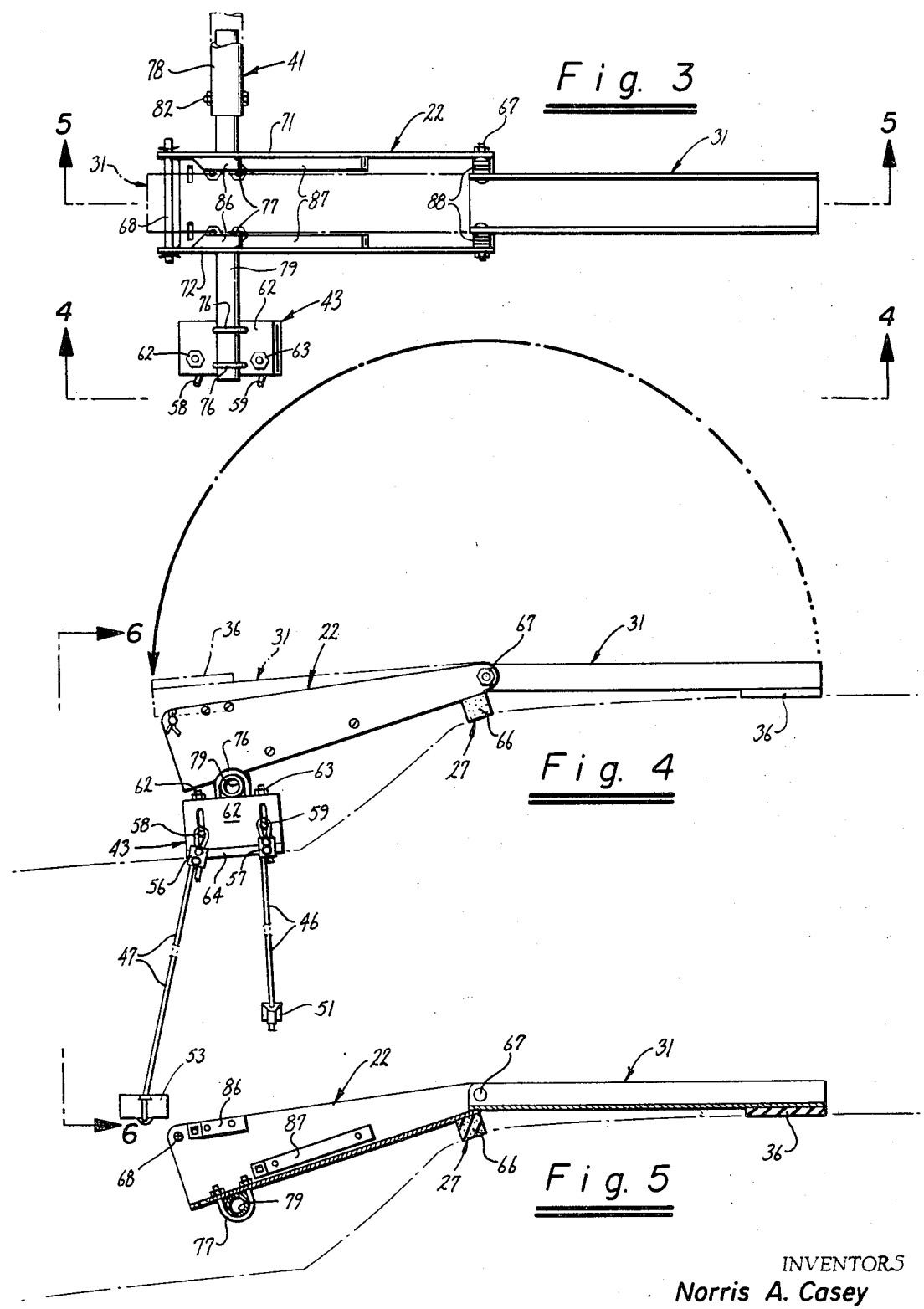

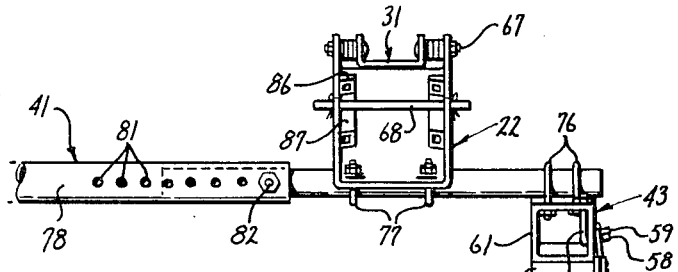
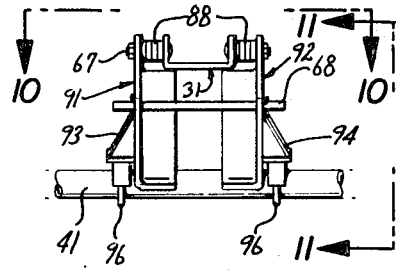
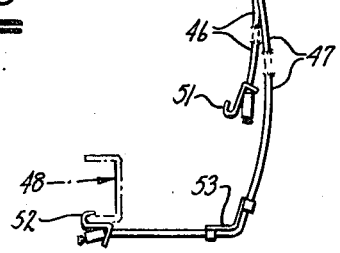
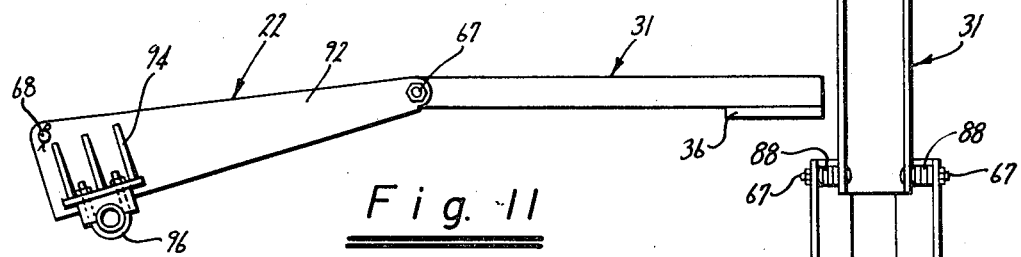
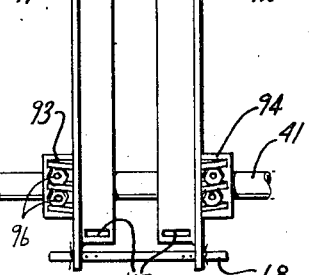
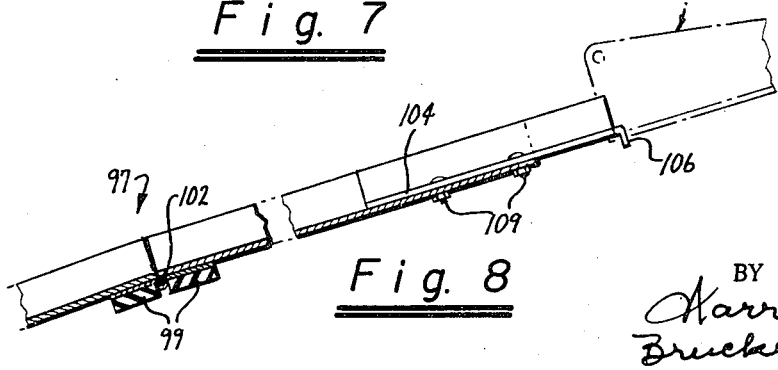

MOTORCYCLE MOUNT FOR AUTOMOBILE BODIES

The invention relates to automobile rack carriers.

Various types of such carriers have been designed for transporting luggage, skis, light boats, etc. There has developed in recent years an increasing use of off-of-the-road-trail type motorcycles and other lightweight motorcycles for recreational use and the need has accordingly arisen for the transporting of such machines on vacation trips and recreational outings. Even a lightweight motorcycle may weigh up to about 300 pounds, and the size and weight of the machine has heretofore precluded its mounting on the top of the automobile in a rack type carrier. The apparatus of the present invention is designed to enable the easy and completely safe positioning of the motorcycle on the top of the automobile; the secure holding in place of the motorcycle during over the road operation of the automobile without significantly interferring with or impairing the operation of the automobile; and the carrying of the load by the body shell of the automobile without indenting of or damage to the automobile body.

The invention possesses other objects and features of advantage, some of which of the foregoing will be set forth in the following description of the preferred form of the invention which is illustrated in the drawings accompanying and forming part of this specification. It is to be understood however that variations in the showing made by the said drawings and description may be adapted within the scope of the invention as set forth in the claims.

REFERRING TO SAID DRAWINGS

FIG. 3 is a plan view of the mount on an enlarged scale.

FIG. 4 is a side elevation of the mount as indicated by lines 4—4 in FIG. 3.

FIG. 5 is a cross-sectional view of the mount taken substantially upon the plane of line 5—5 of FIG. 3.

FIG. 6 is a rear elevation of the mount as indicated by the line 6—6 of FIG. 4.

FIG. 7 is a fragmentary plan view of a portion of the ramp forming part of the invention.

FIG. 8 is a cross-sectional view taken substantially on the plane of line 8—8 of FIGS. 1 and 7.

FIG. 9 is a rear view of the mount similar to FIG. 6 but showing an alternate arrangement.

FIG. 10 is a plan view of the mount as indicated by line 10—10 of FIG. 9; and

FIG. 11 is a side elevation of the mount illustrated in FIG. 9 and as indicated by the plane of line 11—11 of FIG. 9

Figure 1:
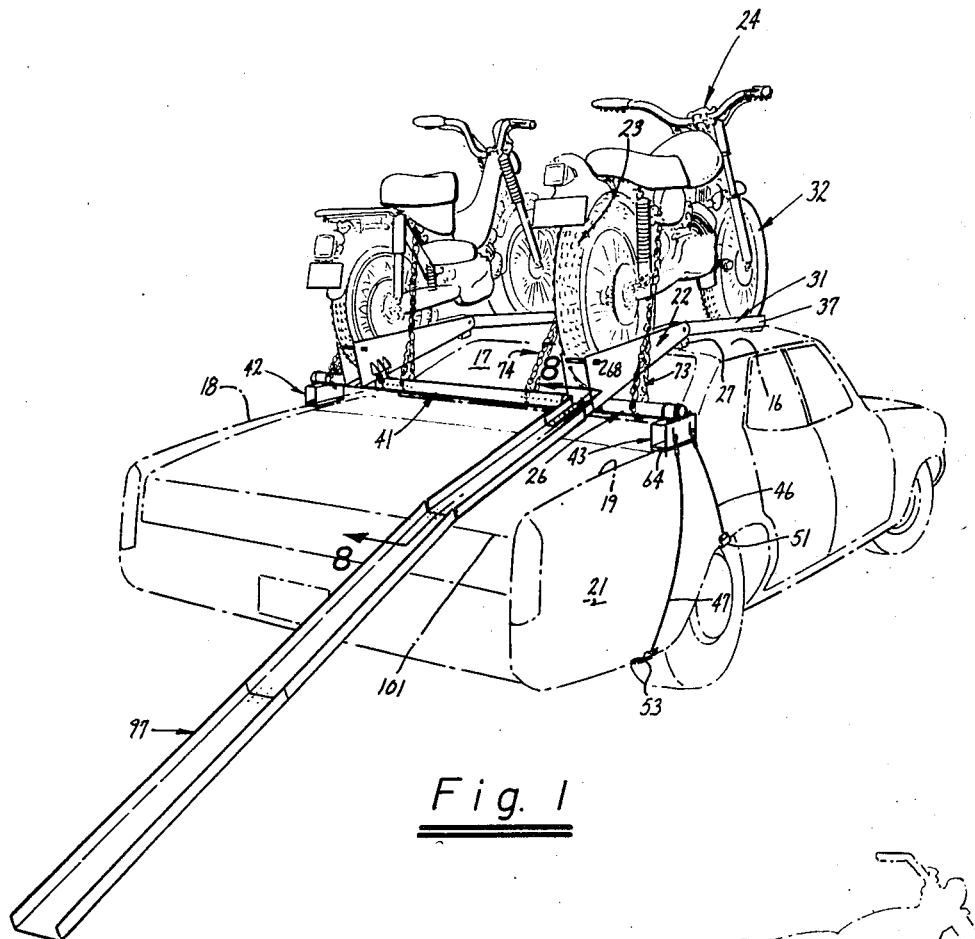
FIG. 1 is a perspective view of a motorcycle mount for automobile bodies constructed in accordance with the present invention.

The motorcycle mount of the present invention is designed for use with an automobile body having a top corner portion 16 at a rear window area 17 and side corner portions surmounting the rear fenders 21, and comprises an elongated trough-shaped section 22 having a width dimensioned to receive the rear wheel 23 of a motorcycle 24 to be mounted on the body; a rear mounting means 26 for section 22 dimensioned and constructed to rest upon the side corner portions 18 and 19; and forward mounting means 27 for section 22 dimensioned and constructed to rest upon the top corner portion 16 with the length of section 22 extending lengthwise of the body.

Figure 2:
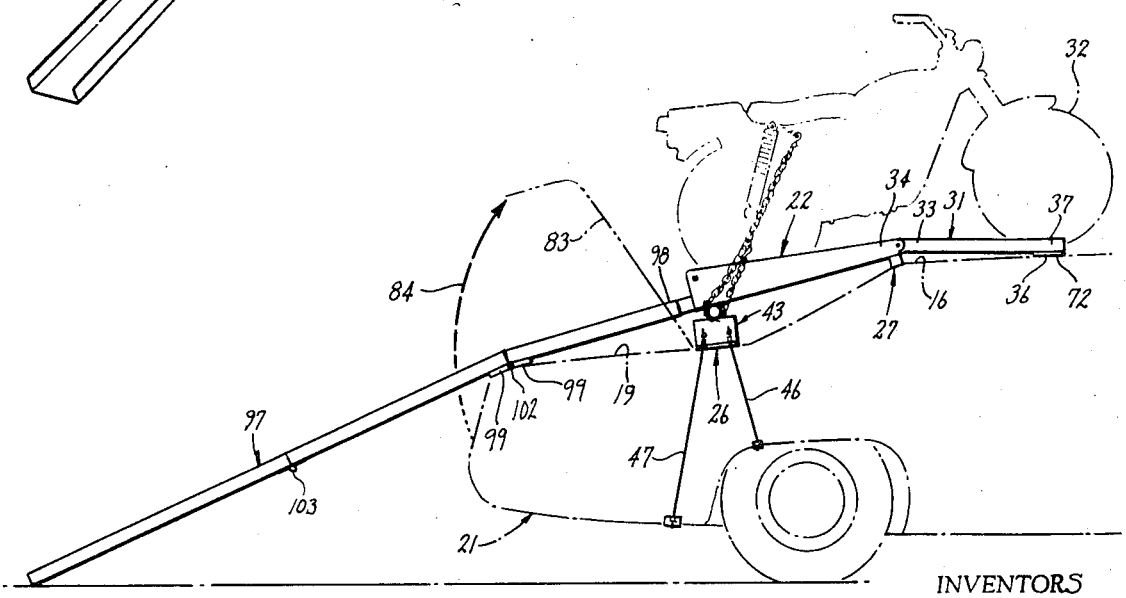
FIG. 2 is a side elevation of the mount.

Preferably and in accordance with the present invention a second elongated trough-shaped section is provided as a longitudinal extension of section 22 and is formed of a width dimensioned to receive the front wheel 32 of the motorcycle. As here shown, section 31 has one end 33 hingedly secured to the forward end 34 of section 22, and a relatively large soft resiliently compressible pad 36 is carried by the forward end 37 of section 31 for resting upon the top of the automobile body, the pad being sized to reduce the unit area loading on the automobile top. The majority of the weight of the motorcycle is normally on the rear wheel and this weight distribution is further affected by the inclined mounting of the motorcycle on the top of the vehicle as seen in FIG. 2. Accordingly, by using a relatively large pad 36, the pressure on the body shell at the forward end of section 31 should not ordinarily exceed 1 to 2 pounds per square inch. Normally the front wheel 32 of the motorcycle is somewhat narrower than the rear wheel 23 and accordingly the forward section 31 may be folded back into a nested position within section 22 when not is use, as depicted in phantom line and by arcuate arrow 38 in FIG. 4. The rear mounting means 26 here comprises an elongated beam member 41 which is designed to span the width of side corner portions 18 and 19 and which is connected medially of its length to section 22; pads 42 and 43 secured to the opposite ends of beam member 41 for mounting on the side corners 18 and 19 of the body; and tension members 46 and 47 connected to and depending from the pads for connection to the body at the underside of the fenders 21. Preferably the tension members are provided in pairs connected to each of the pads and are dimensioned for connection at fore and aft locations to the frame 48 of the body, see FIG. 6, and the bottom edge of fender 21 in the wheel well as seen in FIG. 1 and 2. Hooks 51 and 52 are fastened to the lower ends of tension members 46 and 47 for engaging the respective body parts; and a rubber pad 53, see FIG. 6, is provided on tension member 47 for wrapping around the underside of fender 21 without impairing the finish. The tensioning members may be formed from plastic covered woven steel cable. Adjustable cable clamps 56 and 57 are here used to determine the proper length of the cables for the particular automobile body with which they are to be used and to terminate the upper ends of the cables in eyelets which are engaged by the lower ends of a pair of J-bolts which are in turn mounted through openings in the top of box sections 61 and forming part of pads 42 and 43. Nuts 62 and 63 on the upper ends of J-bolts 58 and 59 permit manual lengthening and shortening of cables 46 and 47 to facilitate attachment, detachment and tensioning thereof. Soft compressible rubber members 64 are mounted at the underside of box sections 61 for engagement with the automobile body. A similar rubber pad 66 is used at the underside of the forward end of section 22 to define the forward mounting thereof so that all points of engagement of the apparatus of the present invention with the automobile body shell is by soft compressible rubber members. It will also be noted, with reference to FIGS. 4 and 5, that the hinged connection 67 between sections 22 and 31 enable the latter to automatically assume an orientation for proper engagement with the automobile body with which they are used. Normally section 22 will incline upwardly, forwardly of the automobile, while section 31 will be relatively horizontal. In such an arrangement it is only necessary to retain the rear wheel 23 of the motorcycle against backing out section 22, and any simple manually actuated closure for the rear end of the section may be used for this purpose, such as a cross-pin 68 inserted through horizontally aligned openings in the spaced upstanding side walls 71 and 72 of the section, the pin being here retained against removal by cotters at its opposite ends. The whole assembly is prevented against sliding back on the automobile body during acceleration of the vehicle or in climbing steep grades by the tensioning cables 46 and 47, and particularly the former which is hooked forwardly into the fender well of the body.

As a further feature of the present invention, tie-down means 73 engageable with beam member 41 and the motorcycle are used for compressibly holding the motorcycle in the rear trough section 22. This means here comprises a pair of chains 74 and 75 which are provided with hooks at their upper ends for engaging the frame of the motorcycle behind the rear seat, the opposite ends of the chain being looped around beam member 41 and then hooked back on itself. Preferably the motorcycle is first tilted to the inside of the vehicle and the inside chain 74 fastened in place. The user may then stand at the outside of the automobile and pull the motorcycle to and somewhat beyond an erect position and secure the outside chain 75 in place as above described. The movement of the motorcycle from a tilted to an erect position with the inside chain in place will compress the spring suspension of the motorcycle so that the latter is very firmly held in place when both of the chains are applied. This attachment is so effective that no further tying-down of the motorcycle is required. However, if desired, tie-downs may be used over the front wheel or frame of the motorcycle attaching such tie-downs to the drip rails along the opposite sides of the top of the body such as used in connection with other rooftop carriers.

Several advantages flow from the use of the elongated transversely extending beam member 41. The pads 42 and 43 may be mounted for longitudinal adjustment on the beam member for accurately positioning the pads upon the desired strong points 18 and 19 of the body. This is here accomplished by U-bolts 76 surrounding member 41 and fastened by nuts positioned at the inner side of box sections 61, see FIGS. 3, 4 and 6. Trough section 22 may be similarly fastened by U-bolts 77, see FIGS. 5 and 6, so that the positioning of the motorcycle mount transversely of the vehicle may be set at will and a number of such mounts may be positioned in side-by-side relation as illustrated in FIG. 1. On a full-size car at least three motorcycle mounts may be so positioned. Finally, and as here illustrated, the beam member 41 may be composed of a pair of slidably attached sections 78 and 79, see FIGS. 3 and 6, providing an adjustable beam length for spanning the distance between the side corner portions 18 and 19 and also permitting contraction of the beam member to a length which will fit within the trunk of the automobile when not in use. As here shown, sections 78 and 79 are tubular telescopically mounted members and are provided with a plurality of registering openings 81 for receipt of a fastening bolt 82 which may be threaded through aligned openings in the members for holding them in longitudinally adjusted position. With the contraction of beam member 41 and the folding of the trough sections 22 and 31, the entire apparatus may be readily stored in the trunk of the automobile. It will also be noted that the mounting of the beam member 41 may be readily effected forwardly of the hinge for the trunk lid 83 so that the trunk may be opened when the motorcycle mount is in place, as illustrated by the arcuate arrow 84 in FIG. 2.

The rear wheels of motorcycles of the general type designed to be carried by the apparatus of the present invention may vary in width from about 2 ¾ inches to about 4 ½ inches. It is desirable to have the rear wheel snugly mounted in the rear channel member 22 in order to hold the motorcycle erect during loading operation with minimum manual support. In order to accommodate trough member 22 to varying wheel widths, side fillers 86 and 87 may be mounted internally of side walls 71 and 72 and secured by screws as illustrated in FIGS. 3, 4 and 5. Spacer washers 88 are here used in hinged joint 67, see FIG. 3, to align the forward section 31 with the center of section 22. An alternate form is shown at the left-hand side of FIG. 1 and in FIGS. 9, 10 and 11 wherein the elongated trough section 22 is formed by a pair of confronting angle members 91 and 92. Mounting brackets 93 and 94 are secured to the exterior sides of angle members 91 and 92 and are in turn mounted on beam 41 by U-bolts 96. As will be understood the confronting angle members 91 and 92 provide a channel therebetween for receiving the rear wheel of the motorcycle and are adjustable in their mounting on beam 41 as above described so as to accommodate motorcycle wheels of different widths. The forward trough section 31 may be hingedly attached to the angle members by bolts and spacers forming a hinged joint in the same manner as above described and as illustrated in FIG. 10.

As an important feature of the present apparatus a trough-shaped ramp 97 is provided for movement of motorcycle 24 on to and off from its loaded position. Importantly the forward end 98 of the ramp is demountably secured to the rear end of section 22 in longitudinal alignment therewith, and a mounting pad 99 is carried by the ramp medially of its length and positioned to rest on the rear deck rear end corner portion 101 of the automobile body, see FIGS. 1 and 2, so that the ramp, like the balance of the apparatus, is supported on a strong point of the automobile body. Desirably pad 99 is incorporated at a hinge point 102 of the ramp so that the latter may break into two slopes at corner portion 101, as seen in FIGS. 1 and 2, so as to thereby accommodate the apparatus to the shape and dimension of the automobile body. A second hinge point 103 is provided for the ramp so that the latter may be composed of a plurality of short sections foldable about joints 102 and 103 into a compact form for storage in the automobile trunk. The detachable connection between the forward end 98 of the ramp and section 22 is best seen in FIGS. 7 and 8. As here shown a pair of elongated detent members 104 are carried by ramp end 98 and project therefrom for connection of hook ends 106 of the detents through openings 107 in section 22. Preferably and as here shown, detent members 104 are of angle form and are provided with a plurality of longitudinally spaced openings 108 which align with openings in ramp end 98 for receipt of fastening bolts 109 and permit selectable extension of the ramp as may be required to fit an individual installation.

Only a single ramp is required for any number of mounts since one ramp may be moved from mount to mount for the placement or removal of motorcycles.

In mounting the motorcycle, the front wheel fork of the motorcycle is first locked for straight-ahead operation, lined up with the bottom of the ramp, following which the user can easily push the motorcycle up the ramp and into place with the wheels located in sections 22 and 31. The motorcycle may then be held in place with one hand while the user uses his other hand to slip closure pin 68 into place at the rear of section 22 so as to hold the motorcycle in place. The height of the rear channel is sufficient to securely and safely hold the motorcycle in place pending the attachment of the tie-down chains 74 and 75 as above explained. When one or more motorcycles is loaded in place, as illustrated in FIG. 1, each of the motorcycles is lined up longitudinally with the travel of the automobile and presents minimum frontal area. It has been found that the planer disposition of the motorcycles operates somewhat as rudders and that the automobile operates very well in straight-ahead driving, as well as around curves and up and down hills. The general open structure of the motorcycle minimizes the effect of cross wind on the operation of the automobile.

We claim:

1. A motorcycle mount for an automobile body having a rear trunk and movable closure therefor, rear fender and contiguous top areas with a top corner portion therebetween, and side corner portions surmounting rear fenders of the body comprising:

a beam having an adjustable length spanning said side corner portions and means securing said beam thereon forwardly of said closure to permit opening thereof and access to said trunk with said beam mounted in place;

a first elongated trough shaped section having a width dimensioned to receive the rear wheel of a motorcycle to be mounted on the body, a rear end of said section being secured to and terminated adjacent said beam, said section having a length locating a front end thereof in position for resting upon said top corner portion with the length of said section extending lengthwise of the body;

a second elongated trough shaped section having a width dimensioned to receive the front wheel of the motorcycle, the rear end of said second section having an articulated connection to the front end of said first section in longitudinal alignment and registration therewith for movement of the front motorcycle wheel through said first section into supported position in said second section, said second section having a length cooperating with said articulated connection for disposing the forward end of said second section in supported position upon the top area of the body and in position for supporting the front wheel of the motorcycle when the rear wheel of the motorcycle is located in said first section; and a trough shaped ramp having a width dimensioned to receive and guide the motorcycle wheels therein and having a forward end demountably secured to the rear end of said first section in longitudinal alignment and registration therewith, said ramp having a length extending downwardly and rearwardly from said first section for disposing the rear end of said ramp on the ground at the rear of the automobile.

2. A motorcycle mount as defined in claim 1 and for an automobile body having a rear deck corner portion at the rear of said trunk, said ramp comprising a plurality of collapsible sections, a forwardly disposed ramp section having one end demountably secured to the rear end of said first section and having a length locating a rear end thereof in supported position upon said rear deck corner portion.

3. A motorcycle mount as defined in claim 1, and flexible-tie-down means engageable with said beam and motorcycle for compressing the motorcycle suspension and compressibly holding the rear motorcycle wheel in said first section.

4. A motorcycle mount as defined in claim 1, said second section being movable between a folded inoperable position nested in said first section and an operable position extending longitudinally therefrom.

5. A motorcycle mount as defined in claim 1, said beam securing means comprising a pair of tension members connected to and depending from each of the opposite ends of said beam, each pair of tension members being dimensioned for connection at fore and aft locations to the frame of the body and the bottom edge of one fender respectively.

6. A motorcycle mount as defined in claim 5, and manually adjustable lengthening means for said tensioning members permitting attachment, detachment, and tensioning thereof.

* * * * *